(No Model.)
J. B. & O. B. JOHNSON.
BALING PRESS.
No. 361,013. Patented Apr. 12, 1887.
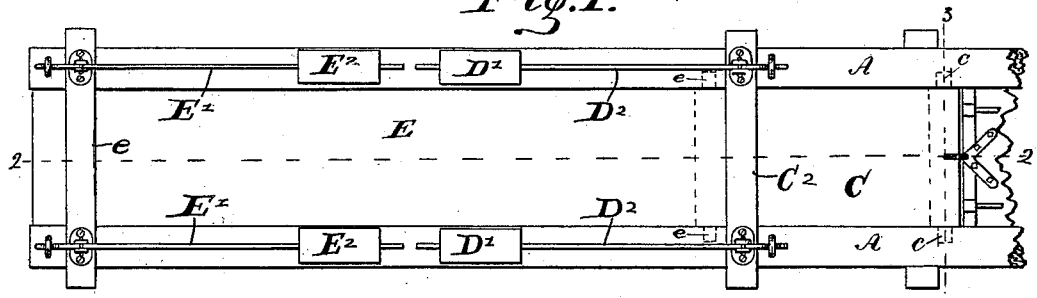
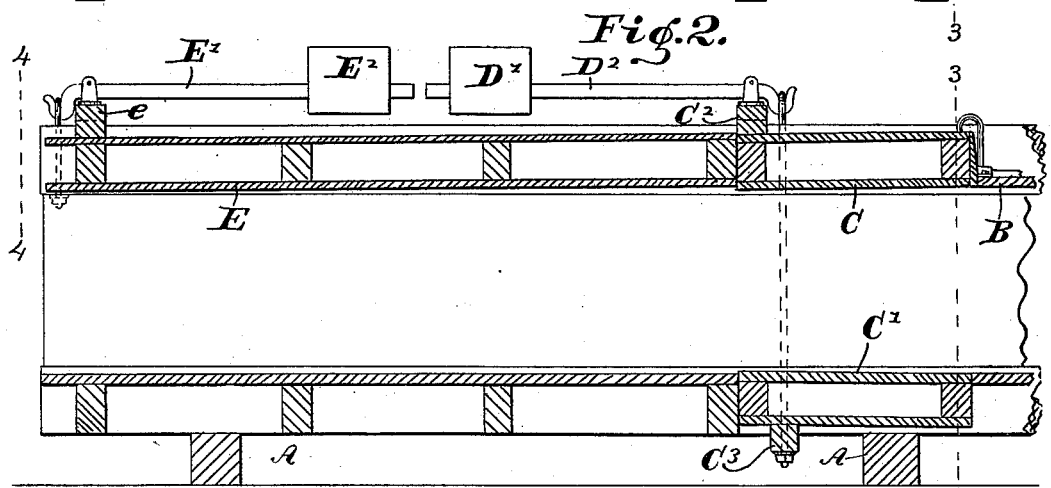
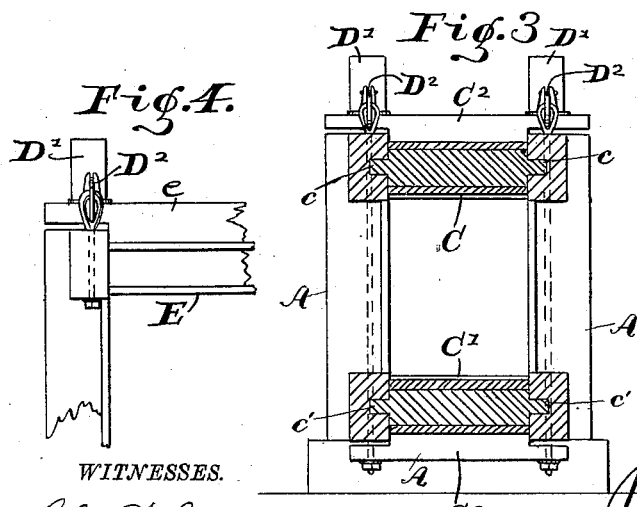
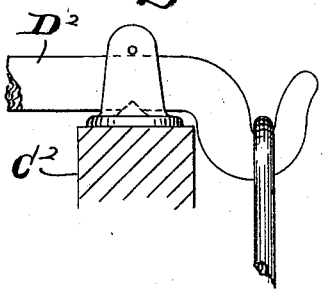
WITNESSES.
Chas. N. Leonard.
E. W. Bradford.
INVENTORS.
Jesse B. Johnson,
and Oscar B. Johnson,
PER
C. Bradford,
ATTORNEY.
N. PETERS, Photo-Lithographer, Washington, D. C.

UNITED STATES PATENT OFFICE.

JESSE B. JOHNSON AND OSCAR B. JOHNSON, OF INDIANAPOLIS, INDIANA.

BALING-PRESS.

SPECIFICATION forming part of Letters Patent No. 361,013, dated April 12, 1887.

Application filed September 17, 1886. Serial No. 213,789. (No model.)

*To all whom it may concern:*

Be it known that we, JESSE B. JOHNSON and OSCAR B. JOHNSON, of the city of Indianapolis, county of Marion, and State of Indiana, have invented certain new and useful Improvements in Baling-Presses, of which the following is a specification.

The object of our said invention is to produce a press which shall make bales of substantially uniform hardness. This object is accomplished by providing pivoted doors in the top and bottom or sides of the pressing-chamber, which are operated to move toward each other by weights, as will be hereinafter more fully described.

Referring to the accompanying drawings, which are made a part hereof, and on which similar letters of reference indicate similar parts, Figure 1 is a top or plan view of all that portion of the press which comprises the pressing-chamber up to and including the front edge of the trap-door through which the material is introduced to be pressed; Fig. 2, a central vertical section of the same; Fig. 3, a transverse vertical section on the dotted line 3 3 in Figs. 1 and 2; Fig. 4, a fragmentary rear elevation as seen from the dotted line 4 4 in Fig. 2; and Fig. 5, a detail elevation of fragments of a weight-lever, its bearing-block, and the rod to which said lever is connected.

In said drawings, the portions marked A represent the frame-work of the press; B, the trap-door through which the material is introduced; C C', the pivoted doors, which are the feature of our invention; $D^2$, weight-levers, by which said pivoted doors are operated; and E, the remainder of the top of the press-structure beyond said pivoted doors, which is itself also in the form of a pivoted door.

The various parts of the press are of a very simple and common construction, which will be readily understood by reference to the drawings, the doors C and C' being pivoted by means of dowels $c$ and $c'$, formed on their ends and engaging with bearings in the frame, as shown in Fig. 3 and in dotted lines in Fig. 1, and the remainder of the top E being pivoted in a similar manner, as indicated by dotted lines in Fig. 1, on the dowels $e$.

The material is first introduced through the trap-door B, as usual, and is forced forward by the plunger or press-head (not shown) of the press. If just the proper bulk of material has been introduced and the bale is sufficiently hard when it starts forward, the pivoted doors C and C' will be forced apart to the general level of the press-chamber. If the bale is slightly softer than has been arranged for, the weights D' on the weight-levers D will operate through the blocks $C^2$ $C^3$ to force the rear or free ends of the pivoted doors C C' toward each other, thus giving said bale an extra pressure. As the bale passes along the pressure-chamber and reaches the rear or outer end thereof, the upper side, E, of said chamber being, as before described, also pivoted, (similar weight-levers E' and weights $E^2$ to the weight-levers D D' being also connected thereto,) said top is also forced down against said bales and maintains the degree of solidity which has been attained in the initial pressure until the bale is delivered complete from the press.

Having thus fully described our said invention, what we claim as new, and desire to secure by Letters Patent, is—

1. The combination, in a press, of the pivoted doors C and C', forming portions of the top and bottom, respectively, of the press-chamber, and the weighted levers connected to said doors and arranged to force them inwardly toward each other, substantially as described, and for the purposes specified.

2. The combination, in a press, of the pivoted doors C C', forming portions of the top and bottom of the press-chamber, the weight-levers D, bearing on pressure-blocks $C^2$ $C^3$ and connected to said pivoted doors, and weights D' on said levers.

3. A press the upper side, E, of which is pivoted and provided with a press-block, $e$, weight-levers E', bearing on said press-block and connected to the frame of the press, whereby said top E will be held down against the bales being pressed with equal and uniform pressure, substantially as set forth.

In witness whereof we have hereunto set our hands and seals at Indianapolis, Indiana, this 14th day of September, A. D. 1886.

JESSE B. JOHNSON. [L. S.]
OSCAR B. JOHNSON. [L. S.]

In presence of—
E. W. BRADFORD,
CHARLES L. THURBER.